United States Patent [19]

Ishii et al.

[11] Patent Number: 4,719,257

[45] Date of Patent: * Jan. 12, 1988

[54] POLYOLEFIN RESIN COMPOSITION

[75] Inventors: Tamaki Ishii, Suita; Shinichi Yachigo, Toyonaka; Manji Sasaki, Ibaraki; Haruki Okamura, Osaka; Masahisa Shionoya, Izumi, all of Japan

[73] Assignee: Sumitomo Chemical Company, Ltd., Osaka, Japan

[*] Notice: The portion of the term of this patent subsequent to Mar. 18, 2003 has been disclaimed.

[21] Appl. No.: 848,114

[22] Filed: Apr. 4, 1986

[30] Foreign Application Priority Data

Apr. 9, 1985 [JP] Japan .................. 60-76272

[51] Int. Cl.⁴ .............................. C08K 5/59
[52] U.S. Cl. .................................. 524/108
[58] Field of Search ........................ 524/108

[56] References Cited

U.S. PATENT DOCUMENTS 4,507,417 3/1985 Ishii et al. ............... 524/419
4,576,734 3/1986 Ishii et al. ............... 526/302

FOREIGN PATENT DOCUMENTS 197793 10/1986 European Pat. Off. ........... 524/108
9025826 2/1984 Japan .

OTHER PUBLICATIONS

Chemical Abstracts 101, vol. 2, No. 8213w.

*Primary Examiner*—Morton Foelak
*Assistant Examiner*—Kriellion Morgan
*Attorney, Agent, or Firm*—Wenderoth, Lind & Ponack

[57] ABSTRACT

Polyolefin resins are thermally stabilized and are also stabilized against yellowing from nitrogen oxide gases by incorporating 3,9-bis[2- 3-(3-tert-butyl-4-hydroxy-5-methylphenyl)propionyloxy -1,1-dimethylethyl]-2,4,8,10-tetraoxaspiro[5.5]undecane.

4 Claims, No Drawings

POLYOLEFIN RESIN COMPOSITION

The present invention relates to a method for improving the thermal stability of polyolefin resins and also preventing the resins from yellowing by nitrogen oxide gases (hereinafter referred to as $NO_x$).

Polyolefin resins have excellent physical, chemical and electrical properties, so that they are formed into molded products, pipes, sheets, films, etc. by various methods such as blow molding, extrusion molding, injection molding, celendering, etc. and used in many fields. It is well known that, when polyolefin resins such as polyethylene, polypropylene, etc. are used alone, they deteriorate in quality due to the action of heat, oxygen and light on processing or use, thereby showing a remarkable reduction in the physical properties accompanied by phenomena such as softening, embrittlement, etc. For the purpose of preventing such phenomena, methods are so far known in which various kinds of antioxidants and light stabilizers are added alone or in combination to the production or processing process for polyolefin resins. Such antioxidants include phenolic type, sulfur-containing and phosphite type antioxidants, etc., and such light stabilizers include benzophenone type, benzotriazole type, cyanoacrylate type, nickel type and hindered piperidine type light stabilizers, etc. On the other hand, recently, such problems have come to be suddenly revealed that the appearance of polyolefin resins is markedly damaged by yellowing caused by $NO_x$ in waste gases represented by combustion gases from automobiles outdoors, combustion gases from oilstoves indoors, etc. But, for preventing such yellowing by $NO_x$, the foregoing method is not sufficiently effective, although it is effective to prevent deterioration by heat, etc. The appearance of methods to improve the thermal stability of polyolefin resins and also to prevent the yellowing of the resins by $NO_x$, has therefore been demanded.

In view of this situation the present inventors extensively studied a method for improving the thermal stability of polyolefin resins and also preventing the resins from yellowing by $NO_x$, and as a result, found that such objects can be attained by incorporating a particular phenolic type compound in polyolefin resins.

Further, the present inventors found that, even if the particular phenolic type compound is used together with thioether type and phosphite type antioxidants or light stabilizers generally added as assistants, in order to prevent deterioration by heat, light, etc. and discoloration by heat, there is no reduction at all in the effect of said compound to prevent $NO_x$ yellowing, and therefore, that said compound can be used together with these antioxidants and light stabilizers. The present inventors thus completed the present invention.

The present invention provides a method for improving the thermal stability of polyolefin resins and also preventing the resins from yellowing by $NO_x$ characterized by blending polyolefin resins with 0.001 to 5 parts by weight of 3,9-bis[2-{3-(3-tert-butyl-4-hydroxy-5-methylphenyl)propionyloxy}-1,1-dimethylethyl]-2,4,8,10-tetraoxaspiro[5.5]undecane (hereinafter referred to as present phenolic type compound) based on 100 parts by weight of said resins.

The phenolic type compound used in the present invention is well known and described in Japanese Patent Kokai (Laid-open) No. 25,826/1984. This Patent Kokai Publication relates to stabilized synthetic resin compositions comprising an ester compound having a group represented by the general formula,

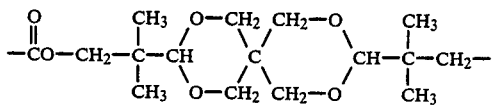

in the molecule obtained by adding the material to synthetic resins, and gives a wide range of phenolic type compounds. But, it gives no description at all on the $NO_x$ yellowing preventing effect of the compounds on polyolefin resins.

The present inventors studied a wide range of phenolic type compounds described in said Patent Kokai Publication, and as a result, found an unexpected fact that, in the phenolic type compounds represented by the general formula (I),

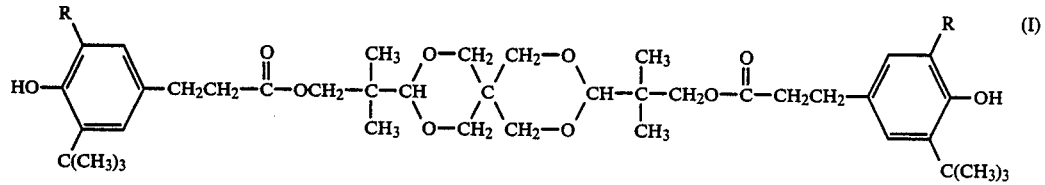

including the present phenolic type compound, when a substituent R is a hydrogen atom or an ethyl, propyl, butyl group, etc., the compound (I) exhibits little effect to prevent $NO_x$ yellowing, and that only when R is a methyl does the compound (I) exhibit a specifically excellent effect in preventing $NO_x$ yellowing.

In the present invention, when the amount of the present phenolic type compound added to polyolefins is too small, sufficient thermal stability is not obtained, while when said amount is too large, the effect corresponding to such amounts is difficult to obtain, being also disadvantageous economically. In order to attain improvement in the thermal stability and prevention of $NO_x$ yellowing at the same time, said amount is generally 0.001 to 5 parts by weight, preferably 0.01 to 1 part by weight based on 100 parts by weight of polyolefin resins.

A method to blend the present phenolic type compound with polyolefin resins is not particularly limited, and the well-known apparatus and procedures generally employed to incorporate stabilizers, pigments, fillers, etc. in polyolefin resins can be used almost as such.

Polyolefin resins used in the present invention include poly α-olefins such as low-density polyethylene, medium- to high-density polyethylene, linear low-density polyethylene, polypropylene, polybutene-1, etc., poly α-olefin copolymers such as propylene/ethylene random or block copolymers, ethylene/butane-1 random copolymers, etc., copolymers of poly αolefin with vinyl monomer such as maleic acid anhydride-modified polypropylene, etc., and mixtures thereof. Further, blends of the polyolefins with rubbers such as isoprene rubber (IR), butyl rubber (IIR), nitrile rubber (NBR), styrene-/butadiene copolymeric rubber (SBR), ethylene/propylene rubber (EPM, EPDM), etc. are also included in the scope of the polyolefin resins used in the present invention. Particularly, the present phenolic type compound is effective for polypropylene.

Thus, according to the method of the present invention, polyolefin resins can be improved in thermal stability and besides prevented from yellowing by $NO_x$, so that they can be used more advantageously in practical use.

The present invention will be illustrated in detail with reference to the following examples, but it is not limited to these examples.

EXAMPLE 1

100 Parts by weight of unstabilized polypropylene resin, 0.1 part by weight of calcium stearate and a predetermined amount, as described in Table 2, of various test compounds were mixed for 5 minutes on a mixer, and melt-kneaded on a mixing roll at 180° C. to obtain a composition. Every compound was formed into a sheet 1 mm thick on a hot press kept at 210° C., and test pieces of 100×40×1 mm (thick) and 40×40×1 mm (thick) in size were prepared from each sheet.

According to "Testing Method for Color Fastness to Nitrogen Oxides" (JIS L 0855), the test piece 100×40×1 mm (thick) was exposed to an atmosphere having an $NO_x$ concentration of 2%, and the $NO_x$ yellowing resistance of the test piece was evaluated based on the degree of coloration after 24 hours' exposure graded in nine steps as follows:

1: yellowish brown
1.5: yellowish brown to yellow
2: yellow
2.5: yellow to pale yellow
3: pale yellow
3.5: pale yellow to very pale yellow
4: very pale yellow
4.5: very pale yellow to colorless
5: colorless The test piece 40×40×1 mm (thick) was placed in a Geer oven kept at 160° C., and measured for a period of time required for 30% of its area to become brittle. This period of time was taken as thermal embrittlement induction period and used for evaluation of the thermal and oxidation stability. The results are shown in Table 2.

Of the test compounds described in Table 2, compounds I-1 and AO-1 to AO-4 are ones shown in Table 1, and compounds AO-5 to AO-9 and LS-1 are ones shown below.

TABLE 1

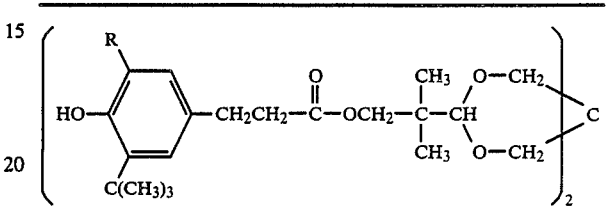

| Compound | R |
|---|---|
| I-1 | —CH₃ |
| AO-1 | —H |
| AO-2 | —CH₂CH₃ |
| AO-3 | —CH(CH₃)₂ |
| AO-4 | —C(CH₃)₃ |
| AO-5 | Pentaerythritol tetrakis{3-(3,5-di-tert-butyl-4-hydroxyphenyl)propionate} |
| AO-6 | n-Octadecyl 3-(3,5-di-tert-butyl-4-hydroxyphenyl)propionate |
| AO-7 | 1,3,5-Tris(4-tert-butyl-3-hydroxy-2,6-dimethylbenzyl)isocyanuric acid |
| AO-8 | Distearyl thiodipropionate |
| AO-9 | Tris(2,4-di-tert-butylphenyl)phosphite |
| LS-1 | Bis(2,2,6,6-tetramethyl-4-piperidyl) sebacate |

TABLE 2

| Example No. | No. | Phenolic type compound Kind | Phenolic type compound Amount (part by weight) | Sulfur-containing compound Kind | Sulfur-containing compound Amount (part by weight) | Phosphite type compound Kind | Phosphite type compound Amount (part by weight) | Light stabilizer Kind | Light stabilizer Amount (part by weight) | $NO_x$ yellowing resistance | Thermal embrittlement induction period (hr) |
|---|---|---|---|---|---|---|---|---|---|---|---|
| Present example | 1 | I-1 | 0.1 | | | | | | | 4 | 400 |
| | 2 | " | 0.3 | | | | | | | 4 | 630 |
| | 3 | " | 0.5 | | | | | | | 4 | 890 |
| | 4 | " | 0.1 | AO-8 | 0.15 | | | | | 4 | 760 |
| | 5 | " | 0.1 | | | AO-9 | 0.15 | | | 4 | 410 |
| | 6 | " | 0.1 | | | | | LS-1 | 0.15 | 4 | 370 |
| Comparative example | 7 | AO-1 | 0.1 | | | | | | | 2.5 | 350 |
| | 8 | " | 0.3 | | | | | | | 2 | 530 |
| | 9 | AO-2 | 0.1 | | | | | | | 2.5 | 360 |
| | 10 | " | 0.3 | | | | | | | 2 | 540 |
| | 11 | AO-3 | 0.1 | | | | | | | 2 | 360 |
| | 12 | " | 0.3 | | | | | | | 1.5 | 540 |
| | 13 | AO-4 | 0.1 | | | | | | | 2.5 | 350 |
| | 14 | " | 0.3 | | | | | | | 2 | 530 |
| | 15 | " | 0.1 | AO-8 | 0.15 | | | | | 2 | 600 |
| | 16 | " | 0.1 | | | AO-9 | 0.15 | | | 2 | 360 |
| | 17 | " | 0.1 | | | | | LS-1 | 0.15 | 2 | 340 |
| | 18 | AO-5 | 0.1 | | | | | | | 2 | 370 |
| | 19 | " | 0.3 | | | | | | | 1.5 | 570 |
| | 20 | AO-6 | 0.1 | | | | | | | 1.5 | 270 |
| | 21 | " | 0.3 | | | | | | | 1.5 | 380 |
| | 22 | AO-7 | 0.1 | | | | | | | 2.5 | 280 |
| | 23 | " | 0.3 | | | | | | | 2 | 400 |

What is claimed is:

1. A method for improving the thermal stability of polyolefin resin and preventing said resin from yellowing by nitrogen oxide gases which comprises blending a polyolefin resin with 0.001 to 5 parts by weight of 3,9-bis[2-{3-(3-tert-butyl-4-hydroxy-5-methylphenyl)propionyloxy}-1,1-dimethylethyl]-2,4,8,10-tetraoxaspiro[5.5]undecane based on 100 parts by weight of said resin.

2. A method as described in claim 1, wherein the polyolefin resin in polypropylene.

3. A composition which comprises a polyolefin resin having incorporated therein 0.001 to 5 parts by weight of 3,9-bis[2-{3-(3-tert-butyl-4-hydroxy-5-methylphenyl)propionyloxy}-1,1-dimethylethyl]-2,4,8,10-tetraoxaspiro[5.5]undecane based on 100 parts by weight of said resin.

4. A composition according to claim 3, wherein the polyolefin resin is polypropylene.

* * * * *